M. FELIX.
AUTOMATIC DETECTOR FOR IDENTIFYING VEHICLES AND THE LIKE.
APPLICATION FILED FEB. 16, 1907.
1,070,882.
Patented Aug. 19, 1913.
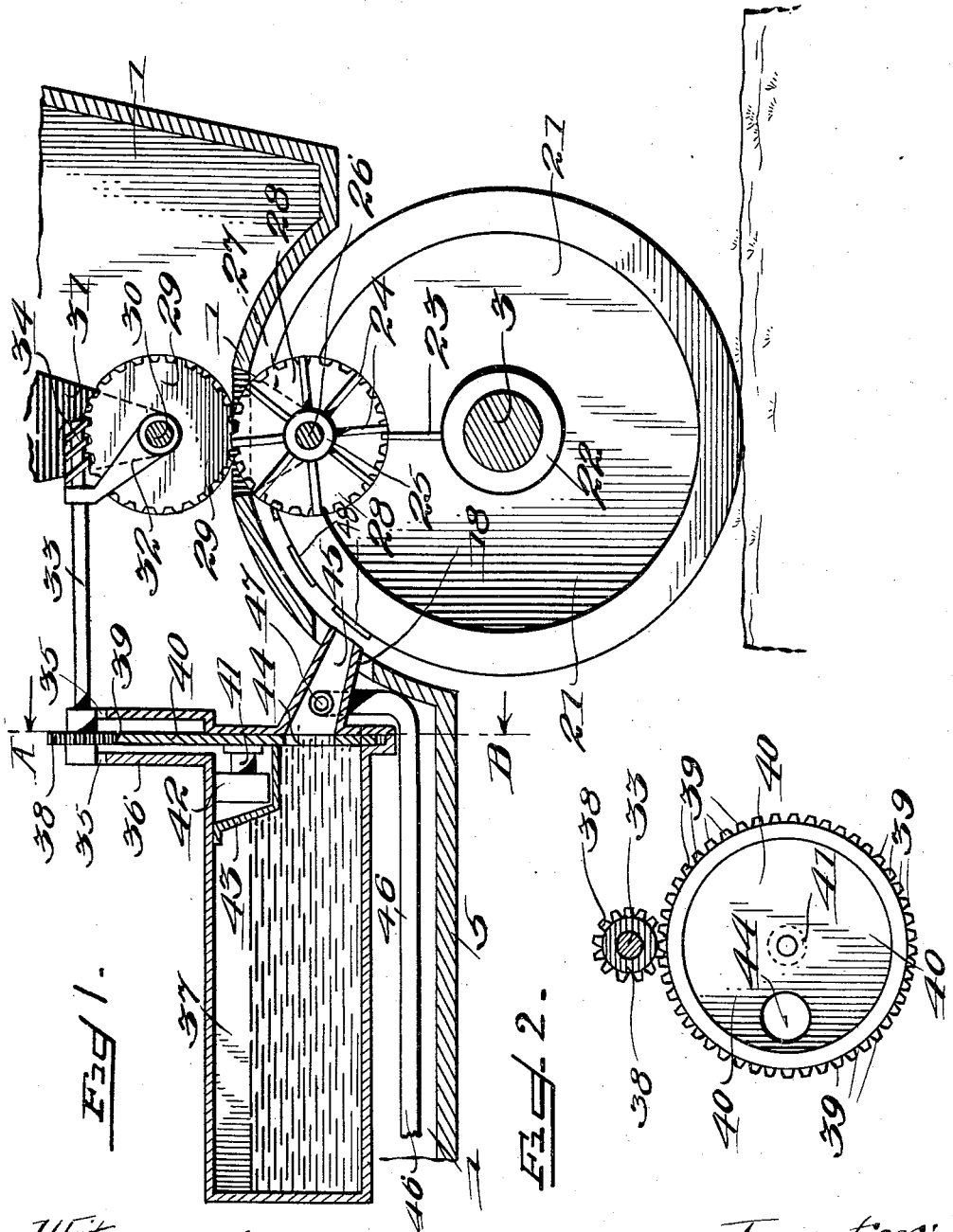

UNITED STATES PATENT OFFICE.

MILDRED FELIX, OF NEW YORK, N. Y.

AUTOMATIC DETECTOR FOR IDENTIFYING VEHICLES AND THE LIKE.

1,070,882.　　　　　Specification of Letters Patent.　　Patented Aug. 19, 1913.

Application filed February 16, 1907.　Serial No. 357,747.

*To all whom it may concern:*

Be it known that I, MILDRED FELIX, a citizen of the United States, residing at New York city, in the county of New York and State of New York, have invented certain new and useful Improvements in Automatic Detectors for Identifying Vehicles and the Like, of which the following is a specification.

My invention relates to improvements in automatic detectors for identifying vehicles and the like, and the object of my invention is to provide means for detecting the identity of vehicles after the same have passed over a roadway or other similar surface.

In the following is described in connection with the accompanying drawings, one embodiment of the invention, the features thereof being more particularly pointed out hereinafter in the claims.

Figure 1 is a longitudinal sectional view of the indicating device showing in connection therewith the application of the adhesive substance or liquid applying means adapted to render the mark of identification to be temporarily fixed on the road-bed or surface over which the vehicle is traveling, and Fig. 2 is a vertical sectional view on the line A—B of Fig. 1.

Similar numerals of reference indicate similar parts throughout the several views.

In the drawings 21 represents the indicating wheel which is mounted on the driving shaft 3 of a suitable vehicle 1. Collar 22 mounted on shaft 3 carries a striking arm or pin 23 adapted to contact with the arms 24 on a star wheel 25 mounted on a shaft 26 suspended from the body of the vehicle 1 by means of a suitable bearing (indicated by dotted lines) 27. 28 is a gear wheel also mounted on shaft 26 and is adapted to engage gear wheel 29 mounted on shaft 30 carried in bearings 31 supported in any suitable way (not shown).

32 is a bearing support mounted on shaft 30 and is adapted to carry a cross-shaft 33 having mounted on its inner end a worm 34 engaging said gear wheel 29 on shaft 30. The other end of the shaft 33 finds its bearing in upwardly projecting lugs 35 mounted on the casing or frame 36 of an adhesive or liquid substance supply tank 37. 38 is a gear wheel mounted on said shaft 33 between the lugs 35 and is adapted to engage the gear teeth 39 formed on the outer periphery of the liquid controlling wheel or member 40 mounted on stud 41 supported in bearing 42 suspended from the top of the supply tank 37. Said bearing 42 is surrounded by casing 43, the object of the latter being to prevent the contents of the tank 37 from coming in contact with said bearing. Wheel 40 is provided with a port or passageway 44 adapted to register with an opening 45 in an ejector nozzle 18.

46 is an air compression tube coming from a suitable source of air compression (not shown). The mouth 47 of said air compression tube 46 opens into opening 45 of ejector nozzle 18.

48, 48 indicate any convenient marks of identity which may be mounted on the periphery of wheel 21 and should be individual to the particular vehicle on which they are mounted. They may comprise letters, numbers or words as is desired.

The operation of the device is as follows: Motion is transmitted from shaft 3 to star wheel 24 and through gear wheel 28 to gear wheel 29 on shaft 30, thus causing worm 34 to actuate gear 38 which in turn actuates wheel 40 on stud 41. The actuation of wheel 40 causes port 44 in said wheel to intermittently register with opening 45 in ejector nozzle 18 and permits a small amount of the temporary fixative or adhesive or liquid substance contained in tank 37 to pass into said opening 45. The air blast through air compression tube 46 into said passageway 45 causes the temporary fixative or adhesive or liquid conveying substance contained therein to be blown over the surface of indicating wheel 21 and upon the marks of identification 48, 48 mounted on the periphery of said wheel.

It is obvious that when such marks of identification 48, 48 pass over the roadway they will leave thereon an imprint which will serve to identify the vehicle bearing such identifying means.

It is obvious that the details of construction as shown herein may be widely varied without departing from the spirit of the invention and I do not wish to restrict myself any further than the appended claims demand.

What I claim and desire to secure by Letters Patent of the United States is:—

1. A device of the character described including an auxiliary running member mounted on means carried by the body of a vehicle, marks of identification on said auxiliary member adapted to be transmitted to the surface whereon said member travels, means for applying to said marks of identification a temporary fixative, means for operating said fixative applying means from the main drive of the vehicle comprising a striking member suitably mounted on said main drive, a train of gears adapted to be actuated by said striking member, auxiliary shafts on the body of said vehicle on which said gears are mounted and a liquid by-pass controlling member adapted to be actuated by said gears.

2. A device of the character described including an auxiliary running member mounted on means carried by the body of a vehicle, marks of identification on said auxiliary member adapted to be transmitted to the surface whereon said member travels, means for applying to said marks of identification a temporary fixative, means for operating said fixative applying means from the main drive of the vehicle comprising a striking member suitably mounted on said main drive, a train of gears adapted to be actuated by said striking member, auxiliary shafts on the body of said vehicle on which said gears are mounted, a liquid by-pass controlling member adapted to be actuated by said gears and means for assisting the application of said fixative to said marks of identification.

In testimony whereof I have hereunto signed my name in the presence of two subscribing witnesses.

MILDRED FELIX.

Witnesses:
ROBERT W. ASHLEY,
MARY T. AVERY.

---

Copies of this patent may be obtained for five cents each, by addressing the "Commissioner of Patents, Washington, D. C."